(12) United States Patent
Kim et al.

(10) Patent No.: US 8,763,490 B2
(45) Date of Patent: Jul. 1, 2014

(54) SPHERICAL TRANSMISSION JOINT

(75) Inventors: Keehoon Kim, Seoul (KR); Manbok Hong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/493,178

(22) Filed: Jun. 11, 2012

(65) Prior Publication Data

US 2013/0102398 A1    Apr. 25, 2013

(30) Foreign Application Priority Data

Oct. 24, 2011   (KR) .................. 10-2011-0108732

(51) Int. Cl.
*B25J 17/00* (2006.01)
*F16D 3/16* (2006.01)

(52) U.S. Cl.
USPC ........... 74/490.05; 464/125; 464/147; 901/28

(58) Field of Classification Search
USPC ........... 464/106, 110, 125, 126, 147; 403/53, 403/57, 58; 901/28, 29; 74/22 A, 25, 74/490.01, 490.05, 490.06
See application file for complete search history.

(56) References Cited

U.S. PATENT DOCUMENTS

| 659,827 | A | * | 10/1900 | Putnam | 464/106 |
| 1,178,529 | A | * | 4/1916 | Loomis | 464/125 X |
| 3,456,458 | A | * | 7/1969 | Dixon | 464/125 X |
| 4,784,005 | A | * | 11/1988 | Balken | |
| 7,442,126 | B2 | * | 10/2008 | Thompson | 464/125 X |

FOREIGN PATENT DOCUMENTS

| EP | 122947 A | * 10/1984 |
| JP | 2009-524530 | 7/2009 |
| KR | 10-0946174 | 3/2010 |

* cited by examiner

*Primary Examiner* — Gregory Binda
*Assistant Examiner* — Josh Skroupa
(74) *Attorney, Agent, or Firm* — NSIP Law

(57) ABSTRACT

A spherical transmission joint has an input shaft connected to a driving source to rotate, an input link fixed to the input shaft to be rotated by the input shaft and having a bent shape, a coupler link rotatably mounted to a first rotary shaft mounted to the input link and having a bent shape, an output link rotatably mounted to a second rotary shaft mounted to the coupler link and having a bent shape, and an output shaft fixed to the output link. This spherical transmission joint for rotating power transmission of inclined shafts is widely used for transmission joints with certain gradients since a rotating angle between an input shaft and an output shaft is ranged wide.

8 Claims, 5 Drawing Sheets

SPHERICAL TRANSMISSION JOINT

CROSS-REFERENCE TO RELATED APPLICATION

This application claims priority to Korean Patent Application No. 10-2011-0108732, filed on Oct. 24, 2011, and all the benefits accruing therefrom under 35 U.S.C. §119, the contents of which in its entirety are herein incorporated by reference.

BACKGROUND

1. Field

The present disclosure relates to a joint for transmitting power, and more particularly, to a transmission joint for easily transmitting power while ensuring a sufficient angle between an input shaft where power is input and an output shaft where power is output.

2. Description of the Related Art

Universal joints for transmitting power between inclined shafts and joints disclosed in Korean Patent Registration No. 10-0946174 (entitled "Reciprocal rotating Power Apparatus") have limits in a rotating angle between an input shaft and an output shaft.

SUMMARY

The present disclosure is directed to providing a spherical joint which may be widely used for transmission joints with certain gradients since a rotating angle between an input shaft and an output shaft is ranged wide.

In one aspect, there is provided a spherical transmission joint, which includes: an input shaft connected to a driving source to rotate; an input link fixed to the input shaft to be rotated by the input shaft and having a bent shape; a coupler link rotatably mounted to a first rotary shaft mounted to the input link and having a bent shape; an output link rotatably mounted to a second rotary shaft mounted to the coupler link and having a bent shape; and an output shaft fixed to the output link.

According to an embodiment, extension lines of the input shaft, the first rotary shaft, the second rotary shaft and the output shaft may intersect at one point.

In addition, according to an embodiment, the coupler link may be bent in a semicircular shape, the first rotary shaft may be rotatably connected to the middle of the coupler link, the second rotary shafts may be respectively rotatably mounted to both ends of the coupler link, and the output link may be rotatably mounted to each of the second rotary shafts.

In addition, the first rotary shaft may be rotatably connected to one end of the coupler link, the second rotary shaft may be rotatably mounted to the other end of the coupler link, and the output link may be rotatably mounted to the second rotary shaft.

In addition, the input shaft and the output shaft may be rotatably supported by a bracket.

In addition, an angle between the input shaft and the first rotary shaft may be identical to an angle between the output shaft and the second rotary shaft.

In addition, an angle between the first rotary shaft and the second rotary shaft may be identical to an angle between the input shaft and the output shaft.

In addition, a flywheel may be mounted to the output shaft.

The spherical transmission joint for rotating power transmission of inclined shafts according to an embodiment of the present disclosure as described above may be widely used for transmission joints with certain gradients since a rotating angle between an input shaft and an output shaft is ranged wide.

In addition, since a gear is not used, the spherical transmission joint may minimize backlash and allow precise rotating power transmission.

Moreover, the spherical transmission joint may be used for medical instruments and industrial robots since it has simple configuration and structure and ensures high precision.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Exemplary embodiments now will be described more fully hereinafter with reference to the accompanying drawings, in which exemplary embodiments are shown.

Figure 1:
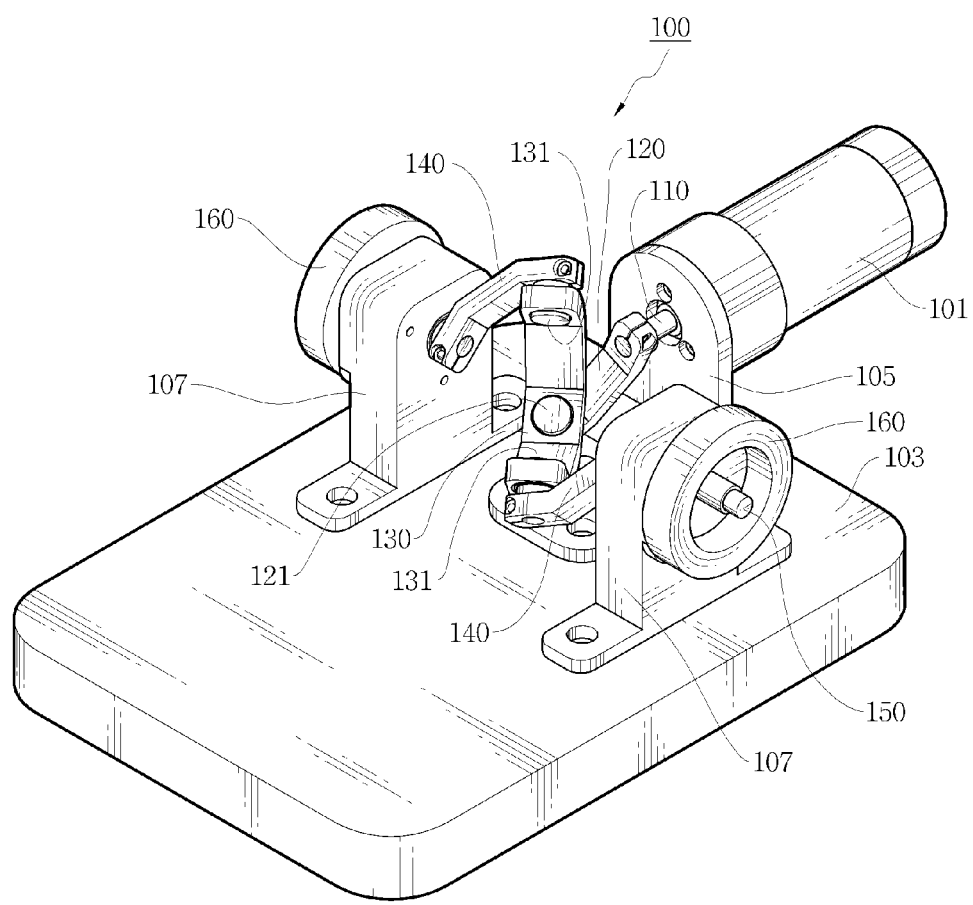
FIG. 1 is a perspective view showing a spherical transmission joint according to an embodiment of the present disclosure.
Figure 2:
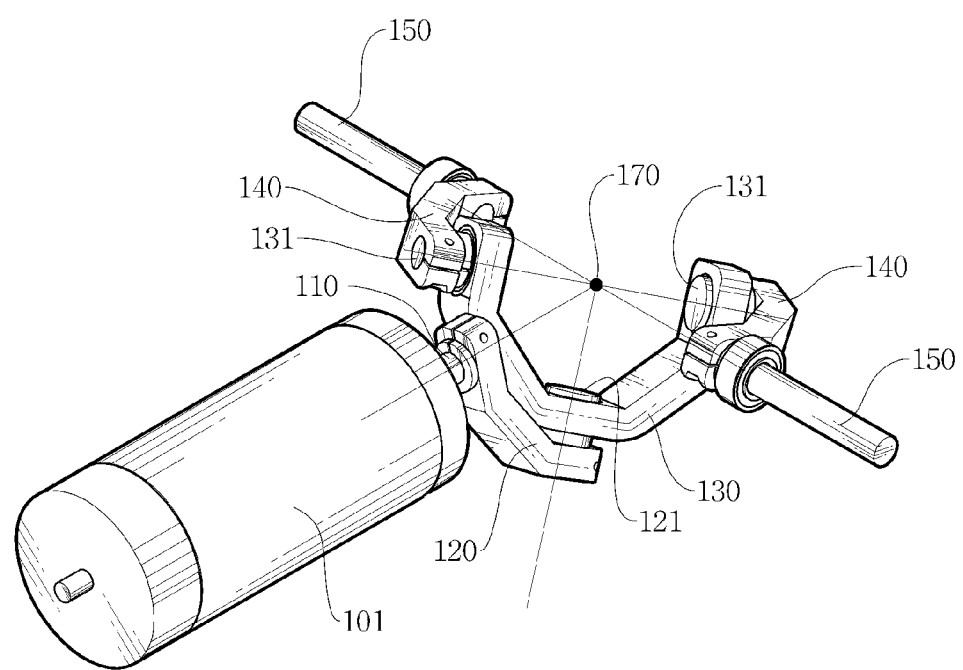
FIG. 2 is a perspective view showing a rotation center point of the spherical transmission joint of FIG. 1.

As shown in FIGS. 1 and 2, a spherical transmission joint 100 includes an input shaft 110 rotated with the power of a motor 101, an output shaft 150 rotated with the power transmitted thereto, an input link 120 having one end fixed to the input shaft 110 and formed to be bent, a coupler link 130 formed to be bent in a semicircular shape and having a middle portion to which the input link 120 is hinged, and output links 140 having one end hinged to the end of the coupler link 130 and the other end bent to be fixed to the output shaft 150.

The input shaft 110 is mounted to a bracket 105, and a bearing is mounted in the bracket 105 so as to support the input shaft 110 to be freely rotatable. Here, the input shaft 110 may be directly coupled to the motor 101 or be connected to the motor by means of a power transmission unit such as a gear or a pulley.

Figure 3:
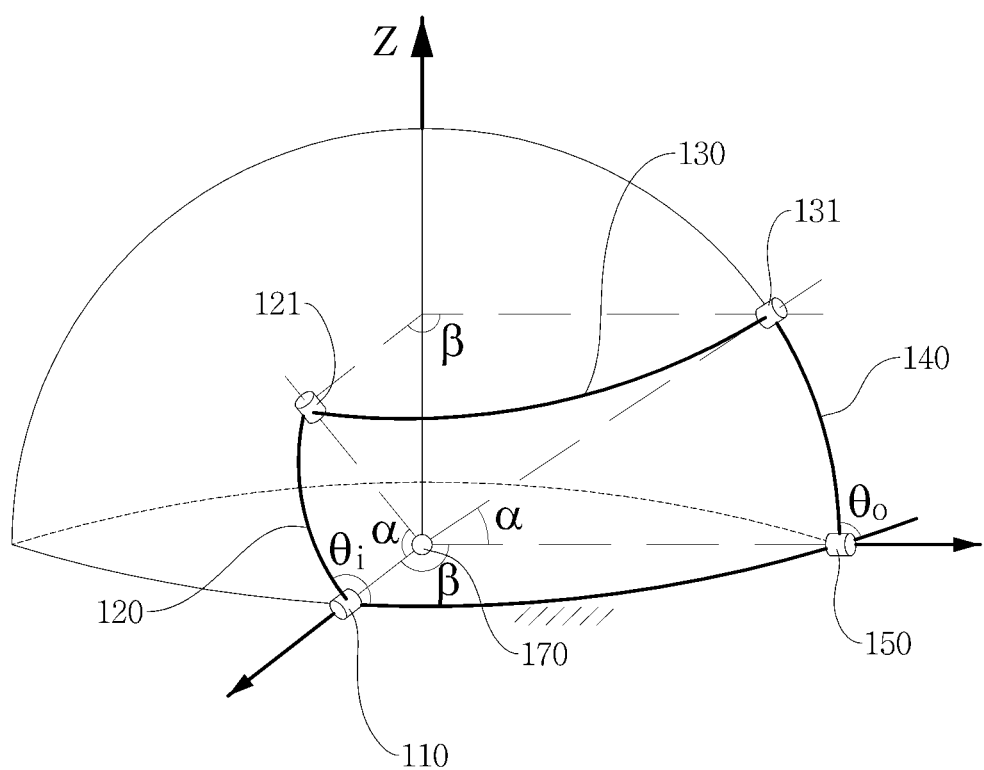
FIG. 3 is a conceptual view showing a driving mechanism of the spherical transmission joint of FIG. 1.

One end of the input link 120 is fixed to the input shaft 110, and a first rotary shaft 121 is rotatably mounted to the other end of the input link 120. As shown in FIG. 3, the input link 120 is bent to have an angle α between the input shaft 110 and the first rotary shaft 121. The input link 120 may be formed to have a bent structure softly connected like a bow or may have bent structures at various points in the middle of its length.

Meanwhile, second rotary shafts 131 are respectively rotatably mounted to both ends of the coupler link 130, and the first rotary shaft 121 is rotatably mounted to the middle of the coupler link 130 in the length direction. As shown in FIG. 3, the coupler link 130 is bent to have an angle β between the first rotary shaft 121 and the second rotary shaft 131 connected to the coupler link 130. The coupler link 130 may be formed to have a bent structure softly connected like a bow or may have bent structures at various points in the middle of its length.

One end of the output link 140 is fixed to the output shaft 150, and the second rotary shaft 131 is rotatably mounted to the other end of the output link 140. The output link 140 is bent to have an angle α between the output shaft 150 and the second rotary shaft 131. The output link 140 may be formed to have a bent structure softly connected like a bow or may have bent structures at various points in the middle of its length.

The output shaft 150 is mounted to a bracket 107, and a bearing is mounted in the bracket 107 to support the output shaft 150 to be freely rotatable. At this time, the angle β between the input shaft 110 and the output shaft 150 is identical to the angle β between the first rotary shaft 121 and the second rotary shaft 131.

As shown in FIG. 3, extension lines of the input shaft 110, the first rotary shaft 121, the second rotary shaft 131 and the output shaft 150 intersect at one point, and this intersecting point is called a 'rotation center point 170'.

The bracket 105 to which the input shaft 110 is rotatably supported and the bracket 107 to which the output shaft 150 is rotatably supported are fixed to a base 103. The base 103 shown in FIG. 1 is depicted in an planar structure for convenience, but the shape of the base 103 may be changed according to a power transmission angle formed by the input shaft 110 and the output shaft 150 so that the angle between the input shaft 110 and the output shaft 150 may be changed suitable for the power transmission angle.

A flywheel 160 (see FIG. 5) may be mounted to the output shaft 150 so that the inertia energy caused by the rotation of the output shaft 150 may be stored in the flywheel 160.

Hereinafter, an operation relation of the spherical transmission joint of this embodiment will be described with reference to FIG. 4.

As shown in FIG. 4(a), in the case where the input link 120 is located horizontally ($\theta_i=0$ degree), the output link 140 is also located horizontally ($\theta_o=0$ degree).

In this state, if the motor 101 rotates so that the input link 120 rotates, as shown in FIGS. 4(b) and 4(c), the coupler link 130 hinged to the input link 120 rotates based on the rotation center point 170 according to the rotation of the input link 120.

In addition, when the input link 120 rotates 180 degrees based on the input shaft 110, as shown in FIG. 4(d), the output link 140 also rotates 180 degrees based on the output shaft 150 ($\theta_i=\theta_o=180$ degrees), and the coupler link 130 allows the input shaft 110 and the output shaft 150 to be symmetrically located, compared with the state of FIG. 4a.

In this state, if the input link 120 keeps rotating, as shown in FIGS. 4(e) and 4(f), the coupler link 130 and the output link 140 rotate to be located as shown in FIG. 4(a).

Figure 4:
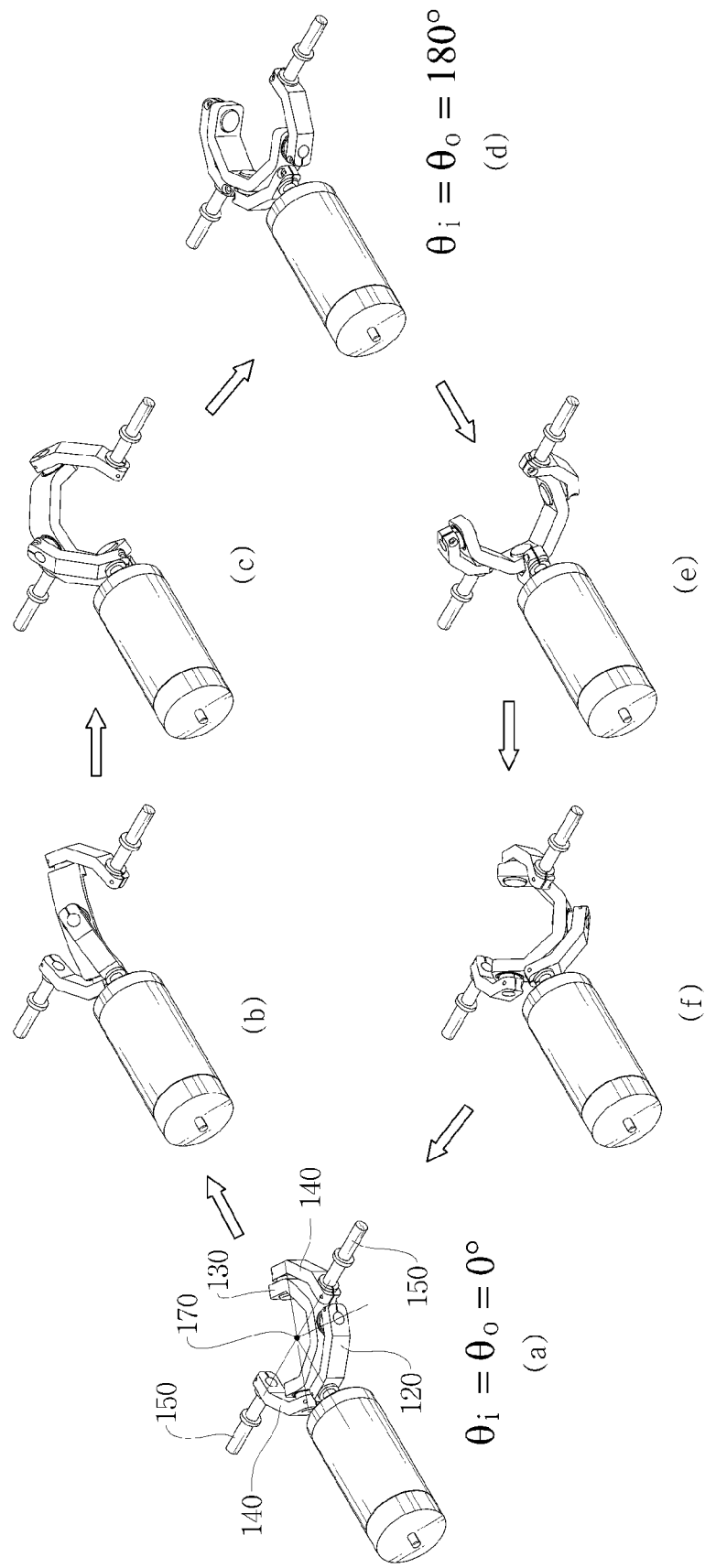
FIG. 4 is a conceptual view for illustrating a driving relation of the spherical transmission joint of FIG. 1.
Figure 5:
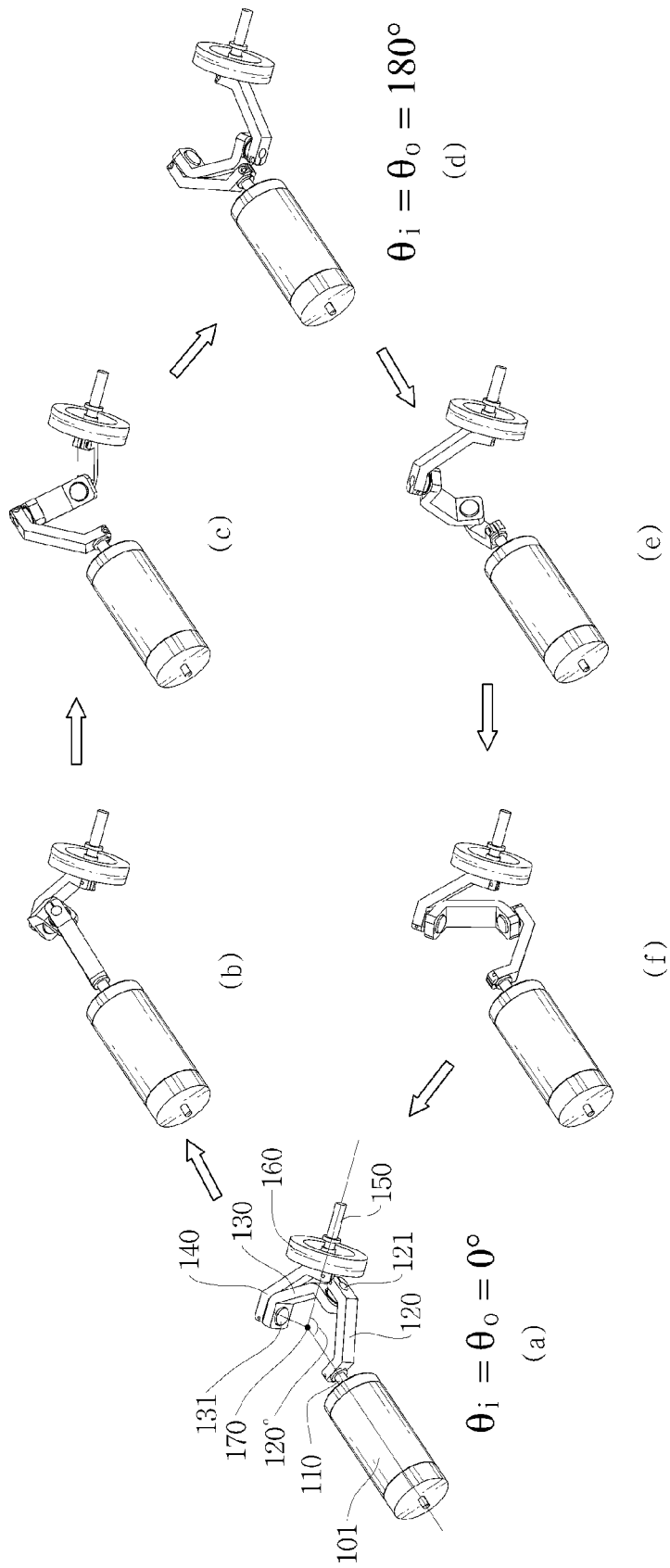
FIG. 5 is a conceptual view for illustrating a driving relation of a spherical transmission joint according to another embodiment of the present disclosure, in a state where the input shaft is not perpendicular to the output shaft.

FIGS. 1 and 4 depicts the process where power is transmitted to the output shaft 150 while the input shaft 110 rotates in a state where the input shaft 110 is perpendicular to the output shaft 150, for convenience. Meanwhile, in another embodiment of the present disclosure, even though the input shaft 110 is not perpendicular to the output shaft 150 as shown in FIG. 5, power may be transmitted. The angle between the input shaft 110 and the output shaft 150, which allows power transmission, will be about 180 degrees.

According to this embodiment, a single output link 140 may be coupled to the coupler link 130. At this time, the angle β between the first rotary shaft 121 and the second rotary shaft 131 connected to the coupler link 130 is identical to the angle β between the input shaft 110 and the output shaft 150.

In this embodiment, as shown in FIG. 5, the flywheel 160 for storing the inertia caused by the rotation of the output shaft 150 is mounted to the outer side of the bracket 107 which supports the output shaft 150. The flywheel 160 is an assisting mechanism for storing the inertia energy in the case where the input link 120 and the output link 140 are located at 180 degrees and the output link 140 rotates as shown in FIGS. 4(a) and 4(d). The flywheel 160 prevents the link from rotating reversely due to its weight when the input link 120 and the output link 140 are located at 180 degrees.

While the present disclosure has been described with respect to the specific embodiments, it will be apparent to those skilled in the art that various changes and modifications may be made without departing from the spirit and scope of the disclosure as defined in the following claims.

What is claimed is:

1. A spherical transmission joint, comprising:
an input shaft connected to a driving source to rotate;
an input link fixed to the input shaft to be rotated by the input shaft and having a bent shape;
a coupler link rotatably mounted to a first rotary shaft mounted to the input link and having a bent shape;
output links having a bent shape, each rotatably mounted at opposite ends of the coupler link using respective secondary rotary shafts; and
output shafts fixed to the output links,
wherein the coupler link is bent in a semicircular shape, and
wherein the first rotary shaft is rotatably connected to the middle of the coupler link.

2. The spherical transmission joint according to claim 1, wherein extension lines of the input shaft, the first rotary shaft, the secondary rotary shafts and the output shafts intersect at one point.

3. The spherical transmission joint according to claim 1, wherein the secondary rotary shafts are respectively rotatably mounted to both ends of the coupler link.

4. The spherical transmission joint according to claim 1, wherein the input shaft is rotatably supported by a bracket.

5. The spherical transmission joint according to claim 1, wherein each output shaft is rotatably supported by a bracket.

6. The spherical transmission joint according to claim 1, wherein an angle (α) between the input shaft and the first rotary shaft is identical to an angle (α) between the output shaft and the secondary rotary shafts.

7. The spherical transmission joint according to claim 1, wherein an angle (β) between the first rotary shaft and the secondary rotary shafts is identical to an angle (β) between the input shaft and the output shaft.

8. The spherical transmission joint according to claim 1, wherein flywheels are mounted to the output shafts.

* * * * *